Sept. 22, 1959 V. W. BOLIE 2,905,935

DECADE TO BINARY CONVERTER

Filed May 22, 1956 2 Sheets-Sheet 1

INVENTOR.
VICTOR W. BOLIE
BY
Moody & Habecker
ATTORNEYS

INVENTOR.
VICTOR W. BOLIE
BY
Moody & Hatecka
ATTORNEYS

United States Patent Office
2,905,935
Patented Sept. 22, 1959

2,905,935

DECADE TO BINARY CONVERTER

Victor W. Bolie, Cedar Rapids, Iowa, assignor to Collins Radio Company, Cedar Rapids, Iowa, a corporation of Iowa Application May 22, 1956, Serial No. 586,406

2 Claims. (Cl. 340—347)

This invention relates to computer devices and more particularly to a device for converting decade information into binary information.

In prior art systems the conversion of decade information into the position of a shaft has been complicated. The process has been attempted by the use of decade notation in the shaft positioning system. Such an approach is not a good solution, however, where a great number of positions are to be ascertained.

It is an object of this invention to provide a device which reads in decade form for the operator's use in reading in information, and which converts this decade information into binary information for direct operation of binary shaft positioning systems.

It is a further object of this device to provide for, simply yet quickly available, the distributive operations, e.g., division and multiplication operations on the read-in information. Thus, for example, frequency information is converted to actual operating frequency for shaft position information where a radio equipment uses both fundamental and harmonic operation of the frequency source, the shaft position being set being that of the frequency source.

This device was invented for control of radio equipment. In many instances remote control of radio equipment is necessary, such as in airborne use. The pilot in an aircraft normally has before him a series of dials or other indicators for selecting the communication channel that he desires. Prior to this invention, binary shaft positioning systems were commonly used, and the dials were based on this binary shaft positioning system and required a code book to translate a desired frequency into a number needed to set the positioning system. This invention eliminates the necessity of a code book, in that the pilot may merely set by hand the knobs of the apparatus to the various decade positions in order to control the desired communication channel of the radio equipment. The present invention automatically converts the decade information into a corresponding position in the radio equipment.

It is a feature of this device that the number of bits of information utilized is readily extended.

It is a further feature of this invention that simple division and multiplication operations are readily performed in the computer section of this converter.

Further objects, features, and advantages of this invention will become apparent from the following description and claims when read in conjunction with the drawings in which:

Figure 1:
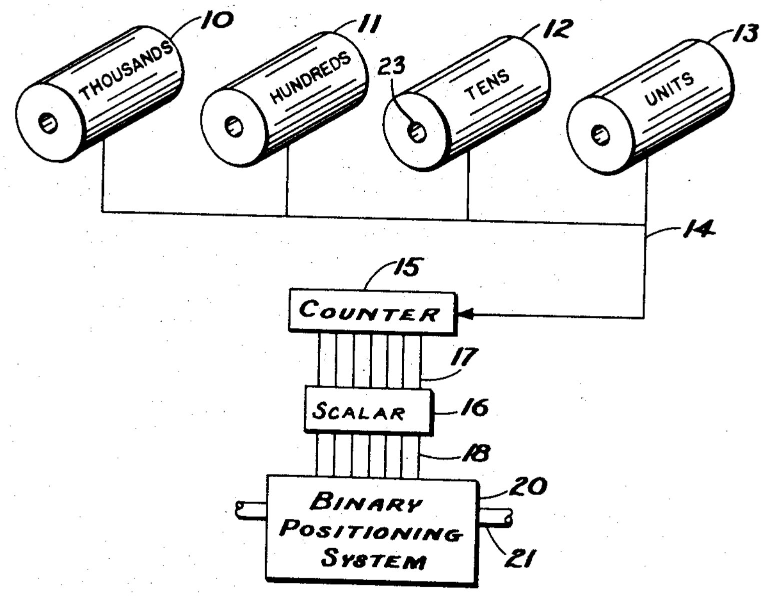
Figure 1 shows a block diagram of the system.

Figure 1 shows the block diagram of the invention. Selector-encoder drums 10, 11, 12, and 13 are connected through cable 14 to counter 15. From cable 14 on, the binary information is carried in space distribution. Each of the encoder drums is assigned a decade in the decimal system. Drum 10 is coded for thousands in binary notation, drum 11 carries the notation for hundreds, drum 12 for tens, and drum 13 for units.

Counter 15 is connected to scalar switch 16. A plurality of wires 17 is shown for illustration of the fact that the output of counter 15 also is carried in space distribution. That is to say, a number registered by counter 15 will selectively energize wires 17 in binary code in accord with the number counted. The term "space distribution" is used in this disclosure in contradistinction to time distribution. For example, in the ignition circuit of an automobile the breaker points make pulses in the primary circuit of the coil. The secondary of the ignition coil has time distributed pulses, but they are of no value until a space distribution has been made of them. The distributor portion of the automobile changes the time distributed chain of pulses in the secondary of the coil into a "space distribution" wherein a particular pulse is fed by a particular wire to a particular sparkplug at the proper time for firing a particular cylinder. Thus, in this invention "space distribution" relates to the idea of applying electrical signals to a plurality of wires so that "space distribution" exists. This voltage on wires 17 remains until changed by reset or by additional decade information inserted and counted. Scalor switch 16 is connected by wires 18 to binary positioning system 20. Positioning system 20 has an output shaft 21 which may be utilized to perform any desired positioning operation such as, for example, the input shaft of an oscillator having a linear frequency versus shaft rotation characteristic. The element 20 may be a binary positioning system such as described in the U.S. Patent No. 2,676,289 for a "Shaft Positioning Mechanism for Binary Code Operation," issued April 20, 1954 to Wulfsberg et al.

The application of the Wulfsberg et al. shaft positioning mechanism to the invention in hand is simply by connection to the wires 18 leading to relays 10, 11, 12, and 13 in Figure 1 of the patent. Binary information on wires 18 then actuates the relays and operates the shaft positioning mechanism. Other types of shaft positioning mechanisms and binary-code sensitive systems may be used in place of the Wulfsberg device.

Code drums 10, 11, 12, and 13 have dials on the front panel and selector knobs to select positions thereon of from zero to nine for each of the decades. The zero position is also used for reset purposes. A suitable detent, not shown, holds the drums 10, 11, 12, and 13 at any preset position.

Figure 2:
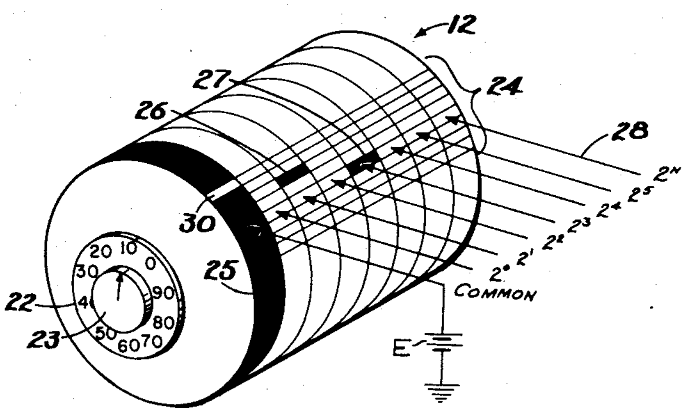
Figure 2 shows a decade encoder drum.

Figure 2 shows code drum 12 in detail. Here, a typical dial 22 is shown in front of the drum to illustrate the selection of the desired number in decade form. Knob 23 is shown as indicating the coding section of the drum intermediate the reset position at zero and the number 10.

Code drum 12 consists of a cylinder divided into nine sections and a blank section. Each section is a repetition of section 24. Section 24 is composed of a continuous arc 25 of conductive material and conductive sections 26 and 27 arranged in binary code which are connected internally to conductive arc 25. Making contact with the conductive sections on the drum is a series of brushes 28, one of which rides on arc 25 and a plurality which ride on portions of the drums corresponding to the various binary number bits.

As seen in Figure 2 each brush, when connected to arc 25 through one of the conductive sections, establishes a complete circuit to one line of cable 14 corresponding to that binary number bit. Here, $2^1$ and $2^3$ are shown with conductive portions in the section 24. Rotation of the drum from the zero or reset portion 30 through to the desired decade number (here 10) causes the brushes 28 to scan section 24. One of the brushes 28 engages arc 25 and is connected to a suitable voltage supply E.

Arc 25 is connected to the source of voltage E through the common brush as shown. Each time one of brushes 28 contacts a conductive portion, that wire is energized in accord with the binary number bit as placed on the surface of code cylinder 12. Portion 26 represents two ($2^1$) and portion 27 represents eight ($2^3$). Thus, rotation of drum 12 from rest point 30 over section 24 encodes onto brushes 28 a space and time distributed voltage having the binary representation of the number 10. Section 24 is repeated for each position of the decades around the drum. As the drum is turned to a higher number, the repeated scanning of the other sections like section 24 feeds in repeatedly the same binary code for the number 10 into the computer.

The binary wires from brushes 28 are carried in cable 14 to computer 15. For a desired setting of the tens drum, each scan of a section causes a binary number representing the number ten to be fed into counter 15. The rotation of the drum is kept slower than the counting ability of counter 15. As a result, the rotation of drum 12 from zero (reset) feeds in, in pulse groups, binary numbers equal to the decade number desired to be converted by the system.

The other drums 10, 11, and 13 operate in a similar manner. The connections relating to the binary bits, $2^0$, $2^1$, $2^2$, . . . $2^n$, found between arc 25 and conducting portions 26 and 27 of drum 12, are parallelled with the same connections from each of the other drums, in cable 14. In each drum the appropriate spaces are made conductive and connected to arc 25 in accord with the binary number to be registered. For tens the second and fourth positions are coded corresponding to a decade number of 1010. For hundreds the third, sixth, and seventh positions would be conductive corresponding to the binary number 1100100. The conductive portions are arranged in a spiral as seen in Figure 2 in order to permit time-scanning of the drum by its rotation to feed in one bit of information at a time to the counter. Thus, a carry is not confused with a bit of information and ignored. Similarly, only one decade (encoding drum) is moved at a time.

Figure 3:
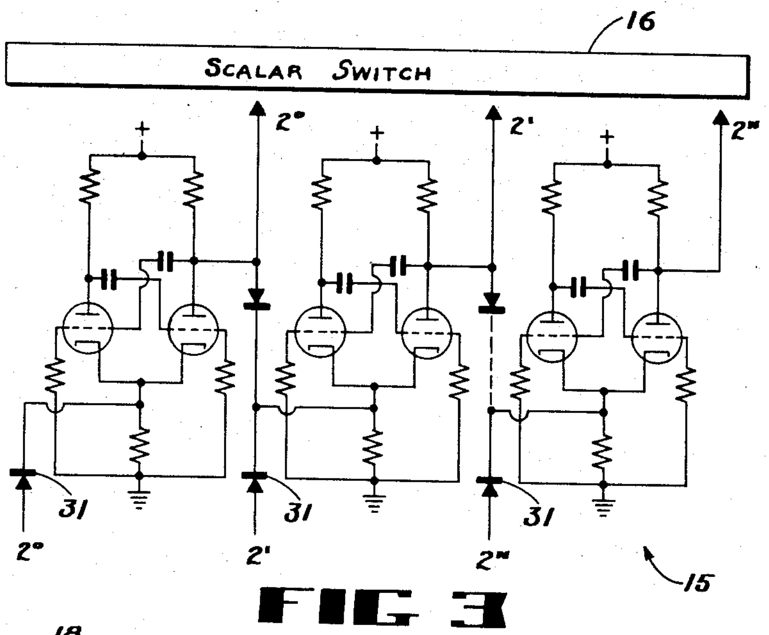
Figure 3 shows a circuit diagram of the counter of Figure 1.

Figure 3 shows the counter 15 and the scalar switch 16. In Figure 3 the notation of $2^n$ is used to illustrate the use of $(n+1)$ bits of information in a binary code system. Standard cathode input bistable multivibrators are used with diodes for carry-over and input couplings. The bistable multivibrator is ideally suited to binary counting in that either plate circuit has either current or no current flowing, which establishes the two possible states in a binary code. The addition of a bit to the multivibrator converts the referenced plate circuit to its other condition of current flow, creating binary addition. The connection of the conductive portions 26 and 27 by drum 12 through arc 25 to a source of potential creates voltage pulses which feed through the input diodes 31. The output of each multivibrator is taken from the second tube's plate circuit with the carry-over to the next multivibrator carried by diodes arranged to block the bit signal input applied to the next multivibrator. This blocking prevents false operation of the previous multivibrator by the signal to the next multivibrator. Thus, each succeeding multivibrator has applied to its cathodes at different times carry pulses and/or bit inputs from the scanning of the drums. The outputs of the multivibrators are connected to the scalar switch.

Figure 4:
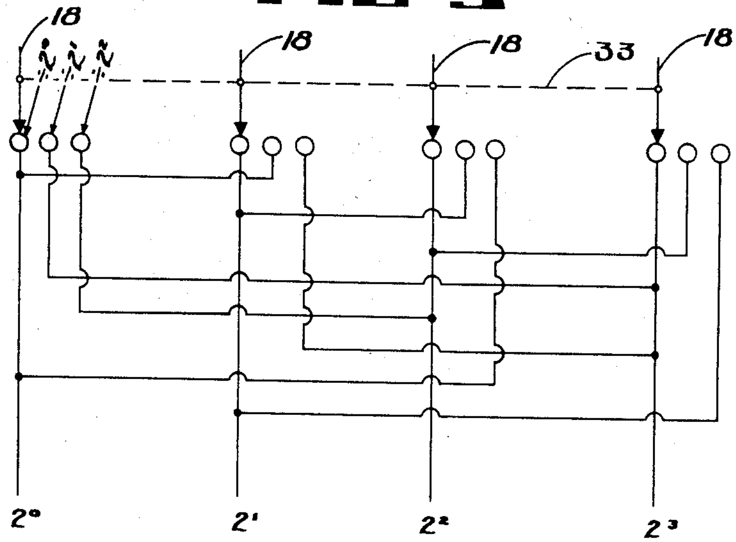
Figure 4 shows the circuit diagram of the scalar switch in Figures 1 and 3.

Figure 4 shows the circuit of the scalar switch. Here, a switch 33 having $(n+1)$ poles is connected into the line between the scalar switch and the $(n+1)$ bits output of the system. The type of switch used as element 33 of Figure 4 may be of any appropriate type. For low orders of binary numbers, wafer-type switches having a satisfactory number of poles and positions may be used. In the event that exceedingly high numbers of binary circuits are switched, the compactness of the printed circuit switch highly recommends it, in that such a position is very adaptable for connecting to circuits utilizing fixed contacts. For an example of a binary wafer-type switch which may be used as a switch 33, reference may be made to Schweighofer-May Patent No. 2,476,673 entitled "Shaft Positioning Control System." In the first position, shown as drawn ($2^0$), the output of the counter is operated directly through to the output of the system. The second position, labeled "Divide by $2^1$," shifts each binary line over one, performing the binary division operation by two. A second shift to the third position of switch 33 shifts the lines yet another time. This provides the division by two again or, in total, by $2^2$. Thus, the scalar switch divides by one, two, or four as desired. The output lines 18 of the scalar switch are then connected to the binary positioning system. It is readily seen that the level of the plate circuit voltage of the outputs of each multivibrator in Figure 3 supplies information through to the actuating portion of the binary positioning system. Return of the relays in Figure 1 of the Wulfsberg patent to the plate supply for the counter's multivibrators instead of to ground as shown in the patent, provides a voltage or no-voltage signal to the relays.

In application of the invention, the decade information set on the encoding drums is in terms of frequency; the binary positioning system sets the oscillator to the requisite frequency. Where it is desired to set the oscillator at one-half or one-fourth the frequency set of the decade system, the scalar switch is used. The information is then divided by two or four after conversion to binary code. This is usable in radio devices where the frequency scheme involves direct and multiplied frequencies of the master oscillator, the multiplication being by one and two or four, correspondingly. The reset operation, as determined by knob 23, involves setting the various decades to zero and resetting the counter 15. The decades are set manually one by one. Also, resetting is a manual operation. For reset, the encoding drums are each set to zero, and the counter reset in any of several ways well known in the art.

Although this invention has been described with respect to particular embodiments thereof, it is not to be so limited because changes and modifications may be made therein which are within the full intended scope of the invention as defined by the appended claims.

I claim:

1. A decimal to binary number converter comprising a plurality of binary encoding drums, each of said encoding drums being positioned to any of ten positions in accord with a desired digit in each decade, one of said positions being open-circuited and equivalent to zero of the decade, the other nine positions each having like sections with selected conductive portions which are fully and sequentially scanned for digits of said decade, a plurality of brushes, each of said brushes corresponding to a digit in the binary number, the contact of each brush with a selected conductive portion in each section forming a binary bit, the scanning of each section resulting in forming progressively the bits of the binary number corresponding to the unit value of that particular decade, said drums having space-distributed binary output lines, said output lines being connected to said brushes, the output lines of each of the encoding drums corresponding to like binary digits being connected together in parallel, a binary counter, said binary counter having a space-distributed input and a space-distributed output, said counter input being connected to the parallelled outputs of said encoding drums, a binary scalar switch connected to said counter output, said binary scalar switch changing the space-distributed output relative to the binary number counted in accord with a desired distributive operation.

2. A decimal to binary number converter comprising a plurality of binary encoding drums, each of said encoding drums being positioned to any of ten positions in accord with a desired digit in each decade, one of said positions being open-circuited and equivalent to zero of the decade, the other nine positions each having like sections with selected conductive portions, said selected conductive portions representing the binary number of the unit value of that particular decade, said sections being fully and sequentially scanned for digits of said decade, said drums having space-distributed binary output lines, the scanning of each section resulting in progressive connection to said output lines to form the bits of the binary number corresponding to the unit value of that particular decade, the output lines of each of the encoding drums corresponding to like binary digits being connected together in parallel, a binary counter, said counter having a space-distributed input and a space-distributed output, said counter input being connected to the parallelled outputs of said encoding drums, a binary scalar switch, said scalar switch having a space-distributed input and a space-distributed output, said input being connected to the output of said binary counter, said scalar switch including a switch having as many poles as lines therethrough, the moving point of each pole of the switch being connected to a respective output line, one position of the fixed contacts of each pole of the switch being connected directly to the input lines, every other position of the fixed contacts being connected to respectively adjacent lines of the scalar switch input in accord with the distributive operation desired, each of the lines which are left over being returned to the other side of its position on the switch in a progressive fashion whereby a distributive operation may be performed by selecting a position of said switch.

References Cited in the file of this patent

UNITED STATES PATENTS

| | | |
|---|---|---|
| 2,657,856 | Edwards | Nov. 3, 1953 |
| 2,676,289 | Wulfsberg | Apr. 20, 1954 |
| 2,693,593 | Crossman | Nov. 2, 1954 |
| 2,656,497 | Schweighafer et al. | Oct. 20, 1957 |

FOREIGN PATENTS

| | | |
|---|---|---|
| 745,907 | Great Britain | Oct. 2, 1953 |
| 748,331 | Great Britain | Oct. 5, 1950 |
| 1,118,484 | France | Mar. 19, 1956 |